US009366185B2

(12) United States Patent
Salamon et al.

(10) Patent No.: US 9,366,185 B2
(45) Date of Patent: Jun. 14, 2016

(54) FLEXIBLE CONNECTION BETWEEN A WALL AND A CASE OF A TURBINE ENGINE

(71) Applicants: Keith T. Salamon, Middletown, CT (US); Matthew A. Turner, Wallingford, CT (US); John P. Tirone, Moodus, CT (US)

(72) Inventors: Keith T. Salamon, Middletown, CT (US); Matthew A. Turner, Wallingford, CT (US); John P. Tirone, Moodus, CT (US)

(73) Assignee: United Technologies Corporation, Farmington, CT (US)

(*) Notice: Subject to any disclaimer, the term of this patent is extended or adjusted under 35 U.S.C. 154(b) by 334 days.

(21) Appl. No.: 13/630,316

(22) Filed: Sep. 28, 2012

(65) Prior Publication Data
US 2014/0090398 A1 Apr. 3, 2014

(51) Int. Cl.
F02C 7/20 (2006.01)
F01D 9/02 (2006.01)
F02K 3/06 (2006.01)

(52) U.S. Cl.
CPC ...... *F02C 7/20* (2013.01); *F01D 9/02* (2013.01); *F02K 3/06* (2013.01); *F05D 2260/941* (2013.01)

(58) Field of Classification Search
CPC .. F01D 25/24–25/28; F01D 9/02; F02C 7/04; F02C 7/20; B64D 33/02; B64D 33/04; F02K 3/06; F05D 2260/941
USPC ........................ 60/797, 796; 244/54
See application file for complete search history.

(56) References Cited

U.S. PATENT DOCUMENTS

| 3,826,088 | A | * | 7/1974 | Nash et al. ................. 60/766 |
| 4,369,016 | A | * | 1/1983 | Dennison .................... 415/142 |
| 4,715,779 | A | | 12/1987 | Suciu |
| 5,088,279 | A | * | 2/1992 | MacGee ..................... 60/226.1 |
| 5,088,660 | A | | 2/1992 | Karanian |
| 5,136,840 | A | * | 8/1992 | Nash ........................... 60/226.3 |
| 5,369,952 | A | * | 12/1994 | Walters .................... F02C 7/222 188/381 |
| 5,433,070 | A | | 7/1995 | Amelio |
| 5,558,919 | A | | 9/1996 | Toni et al. |
| 5,592,814 | A | * | 1/1997 | Palusis et al. ................. 60/770 |
| 5,697,213 | A | * | 12/1997 | Brewer et al. ................ 60/766 |
| 5,704,208 | A | * | 1/1998 | Brewer et al. ................ 60/766 |
| 6,041,590 | A | * | 3/2000 | Hayton .................. F02K 1/822 60/766 |
| 6,086,326 | A | | 7/2000 | Honda et al. |
| 6,216,442 | B1 | * | 4/2001 | Belsom et al. ............... 60/797 |
| 6,565,313 | B2 | | 5/2003 | Nikkanen et al. |
| 6,640,537 | B2 | * | 11/2003 | Tse ................................ 60/262 |
| 6,766,639 | B2 | * | 7/2004 | Malmborg ................. 60/226.1 |
| 6,904,756 | B2 | * | 6/2005 | Mack ........................... 60/796 |
| 6,905,303 | B2 | | 6/2005 | Liu et al. |

(Continued)

*Primary Examiner* — Phutthiwat Wongwian
*Assistant Examiner* — Jason H Duger
(74) *Attorney, Agent, or Firm* — O'Shea Getz P.C.

(57) ABSTRACT

A wall assembly includes a wall that extends axially along a centerline, and circumferentially at least partially around the centerline. The wall assembly also includes a plurality of mounting brackets arranged circumferentially around the centerline, and a plurality of wall brackets. Each of the mounting brackets includes a groove that extends axially into the respective mounting bracket. Each of the wall brackets includes a tongue and a base. The tongue extends axially from the base into the groove of a respective one of the mounting brackets. The base is connected to the wall.

19 Claims, 6 Drawing Sheets

(56) References Cited

U.S. PATENT DOCUMENTS

| | | | |
|---|---|---|---|
| 6,910,860 B2 | 6/2005 | Glover et al. | |
| 7,325,810 B2 * | 2/2008 | Henry | B65D 88/54 174/503 |
| 7,455,498 B2 | 11/2008 | Zysman | |
| 7,493,771 B2 * | 2/2009 | Lohmueller | F01D 25/28 415/136 |
| 7,581,382 B2 * | 9/2009 | Sadil | F01D 17/105 251/301 |
| 7,716,932 B2 * | 5/2010 | Core | 60/771 |
| 7,721,522 B2 * | 5/2010 | Farah et al. | 60/39.5 |
| 7,762,075 B2 * | 7/2010 | Pangle et al. | 60/752 |
| 7,975,488 B2 * | 7/2011 | Farah et al. | 60/770 |
| 8,424,312 B2 * | 4/2013 | Conete et al. | 60/796 |
| 8,511,098 B2 * | 8/2013 | Martinez | 60/796 |
| 8,777,576 B2 | 7/2014 | Kray et al. | |
| 2004/0096135 A1 | 5/2004 | Kammel et al. | |
| 2005/0229585 A1 * | 10/2005 | Webster | 60/226.1 |
| 2009/0053046 A1 * | 2/2009 | Black et al. | 415/173.1 |
| 2009/0145099 A1 | 6/2009 | Jennings et al. | |
| 2009/0324390 A1 | 12/2009 | Harper et al. | |
| 2011/0138769 A1 | 6/2011 | Costa et al. | |
| 2011/0146299 A1 * | 6/2011 | Hoyland et al. | 60/797 |
| 2011/0314829 A1 * | 12/2011 | Kuppusamy | 60/752 |
| 2012/0137705 A1 * | 6/2012 | Ura | 60/796 |
| 2012/0224958 A1 | 9/2012 | Reed et al. | |

* cited by examiner

FLEXIBLE CONNECTION BETWEEN A WALL AND A CASE OF A TURBINE ENGINE

BACKGROUND OF THE INVENTION

1. Technical Field

This disclosure relates generally to a turbine engine and, more particularly, to a connection between a bypass duct wall and a turbine engine case.

2. Background Information

A turbine engine may include an annular bypass gas path that directs bypass air out of the engine to provide engine thrust. Such a bypass gas path is defined by a bypass duct, which may include an annular inner bypass duct wall arranged adjacent to and downstream of a plurality of exit guide vanes. Opposing axial ends of the duct wall may be rigidly connected to a case that houses a turbine engine core. Such rigid connections, however, enable loads to be transferred from the case to the duct wall, which can significantly increase internal stresses within the duct wall.

SUMMARY OF THE DISCLOSURE

According to an aspect of the invention, a wall assembly is provided for a turbine engine. The wall assembly includes a wall, a plurality of mounting brackets and a plurality of wall brackets. The wall extends axially along a centerline, and circumferentially at least partially around the centerline. The mounting brackets are arranged circumferentially around the centerline. Each of the mounting brackets includes a groove that extends axially into the respective mounting bracket. Each of the wall brackets includes a tongue and a base, which is connected to the wall. The tongue extends axially from the base into the groove of a respective one of the mounting brackets.

According to another aspect of the invention, another wall assembly is provided for a turbine engine. The wall assembly includes a wall, a mounting bracket and a wall bracket. The wall extends axially along a centerline, and circumferentially at least partially around the centerline. The mounting bracket includes a groove that extends axially into the mounting bracket. The groove has a radial groove height. The wall bracket includes a tongue and a base, which is connected to the wall. The tongue extends axially from the base into the groove, and has a radial tongue thickness that is less than the radial groove height.

According to still another aspect of the invention, a turbine engine is provided that includes a core housed within a core case, and a bypass duct. The core case extends axially along a centerline. The bypass duct extends circumferentially at least partially around the centerline. The bypass duct includes a duct wall, a plurality of mounting brackets connected to the core case, and a plurality of wall brackets. Each of the mounting brackets includes a groove that extends axially into the respective mounting bracket. Each of the wall brackets includes a tongue, a base and a mount. The tongue extends axially into the groove of a respective one of the mounting brackets. The base is arranged axially between the tongue and the mount. The base is connected to the duct wall. The mount is connected to the core case.

The wall may be an annular duct wall such as, for example, a bypass duct wall.

The wall may include a plurality of panels arranged circumferentially around the centerline. The base of a first of the wall brackets may (e.g., circumferentially) connect a first of the panels to a second of the panels.

The groove of a first of the mounting brackets may have a radial groove height. The respective tongue that extends into the groove of the first of the mounting brackets may have a radial tongue thickness. The tongue thickness may be less than or substantially equal to the groove height.

The groove may extend axially into the respective mounting bracket to a groove end surface. The respective tongue that extends into the groove of the first of the mounting brackets may be separated from the groove end surface by an axial length. Alternatively, the respective tongue that extends into the groove of the first of the mounting brackets may axially engage (e.g., contact) the groove end surface.

The tongue of a first of the wall brackets may include a wear member that radially engages a respective one of the mounting brackets.

The groove of a first of the mounting brackets may have an arcuate cross-sectional geometry. Alternatively, the groove of the first of the mounting brackets may have a substantially rectangular cross-sectional geometry.

A first of the wall brackets may include a mount with one or more fastener apertures. The base of the first of the wall brackets may be arranged axially between the tongue of the first of the wall brackets and the mount.

The mounting bracket may be one of a plurality of mounting brackets that are arranged circumferentially around the centerline. The wall bracket may be one of a plurality of wall brackets. The tongue of each of the wall brackets extends into the groove of a respective one of the mounting brackets.

A first of the mounting brackets may be rigidly connected to the core case. The mount of a first of the wall brackets may be rigidly connected to the core case.

The bypass duct may include one or more stator vanes arranged upstream of the duct wall.

The foregoing features and the operation of the invention will become more apparent in light of the following description and the accompanying drawings.

DETAILED DESCRIPTION OF THE INVENTION

Figure 1:
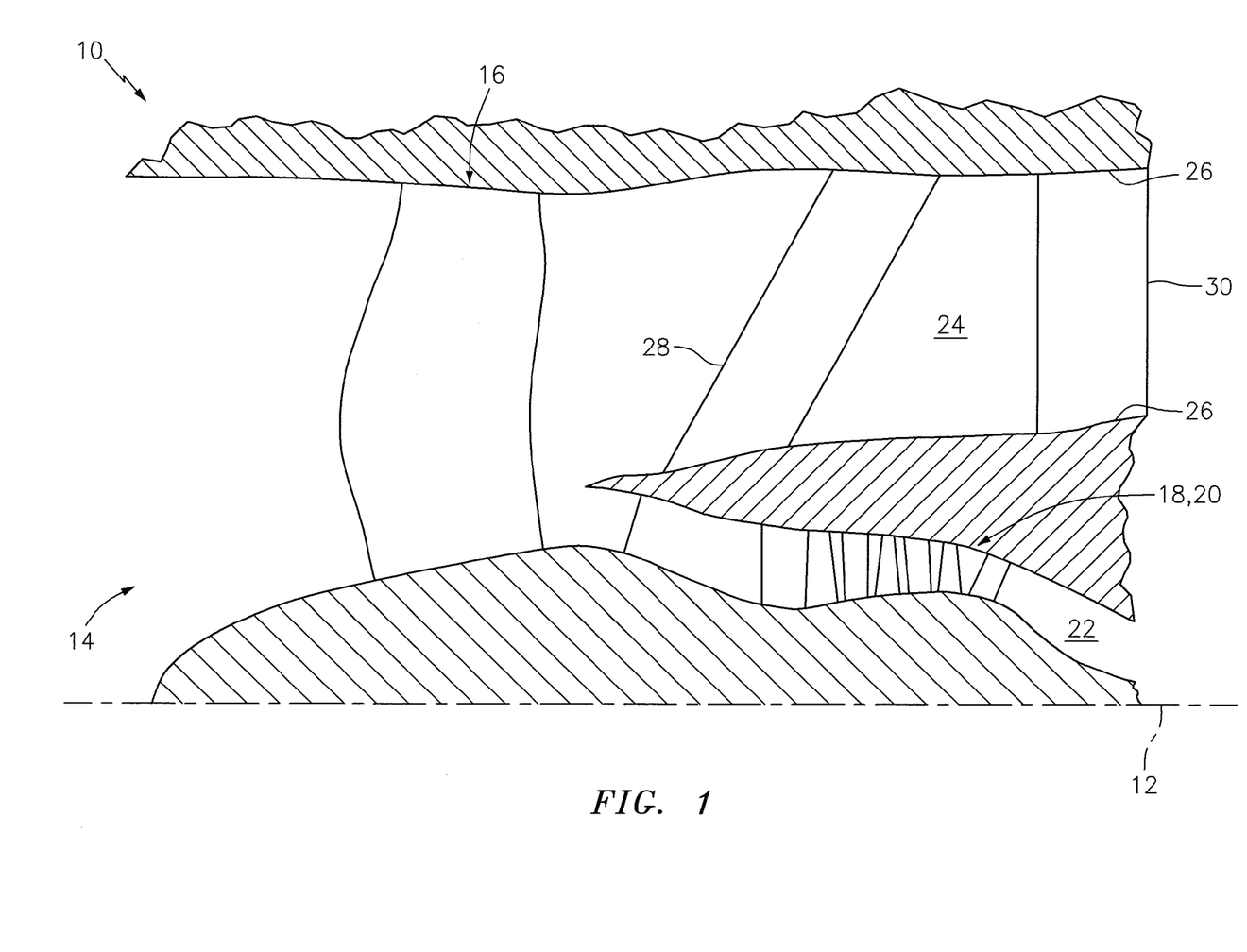
FIG. 1 is a sectional illustration of a forward portion of a turbine engine.

FIG. 1 is a sectional illustration of a forward portion of a turbine engine 10. The engine 10 extends axially along a centerline 12 between a forward airflow inlet 14 and an aft airflow exhaust. The engine 10 includes a fan section 16 and a turbine engine core 18, which includes a compressor section 20, a combustor section and a turbine section.

Air enters the engine 10 through the airflow inlet 14, and is directed through the fan section 16 and into an annular core gas path 22 and an annular bypass gas path 24. The air within the core gas path 22 may be referred to as "core air". The air within the bypass gas path 24 may be referred to as "bypass air" or "cooling air". The core air is directed through the core 18 and exits the engine 10 through the airflow exhaust. Within the core 18, fuel is injected into and mixed with the core air and ignited to provide engine thrust. The bypass air may be directed through the bypass gas path 24 and out of the engine 10 to provide additional engine thrust. The bypass air may also or alternatively be utilized to cool various turbine engine 10 components within the core 18.

Figure 2:
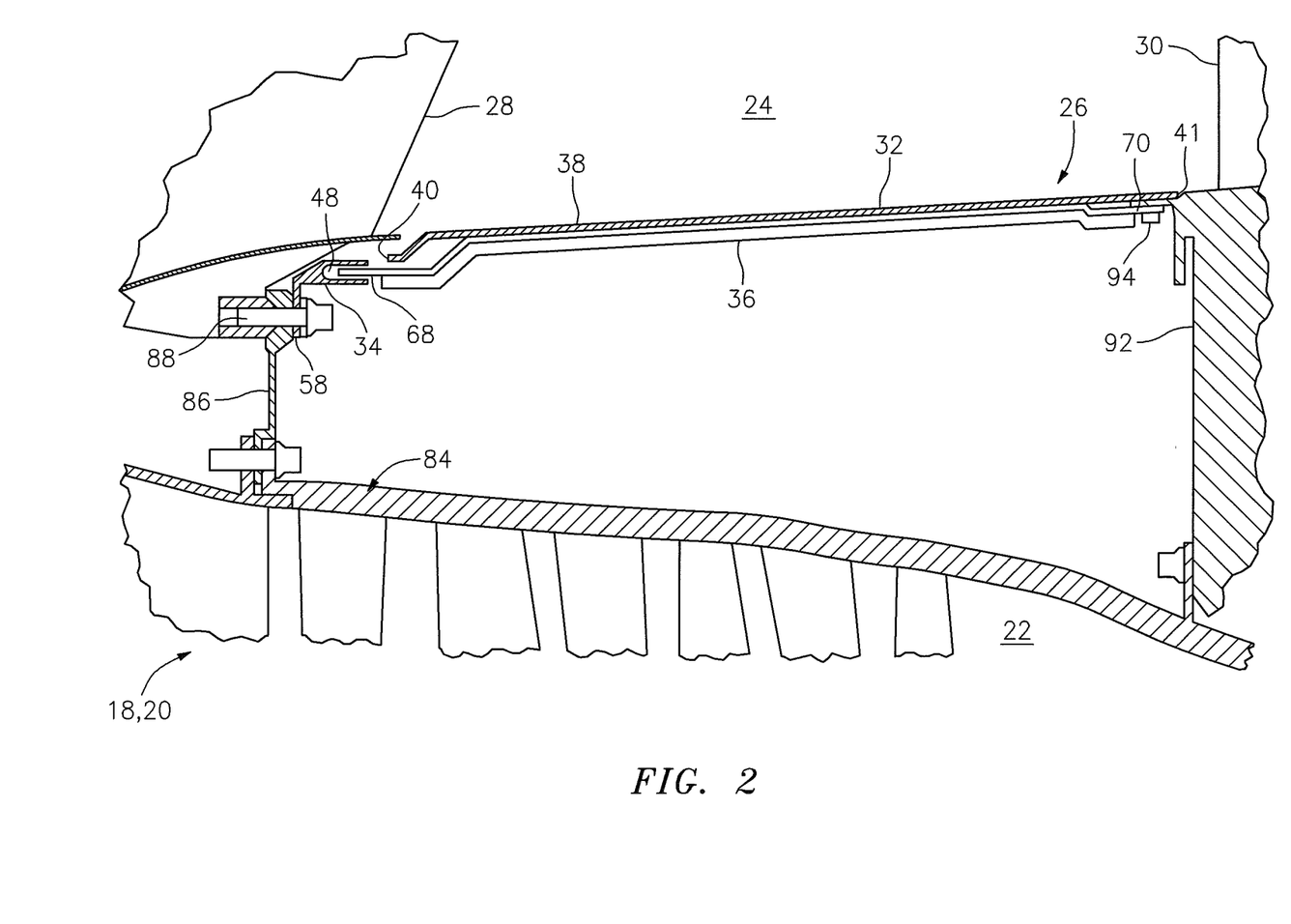
FIG. 2 is a sectional illustration of a portion of the engine of FIG. 1.
Figure 3:
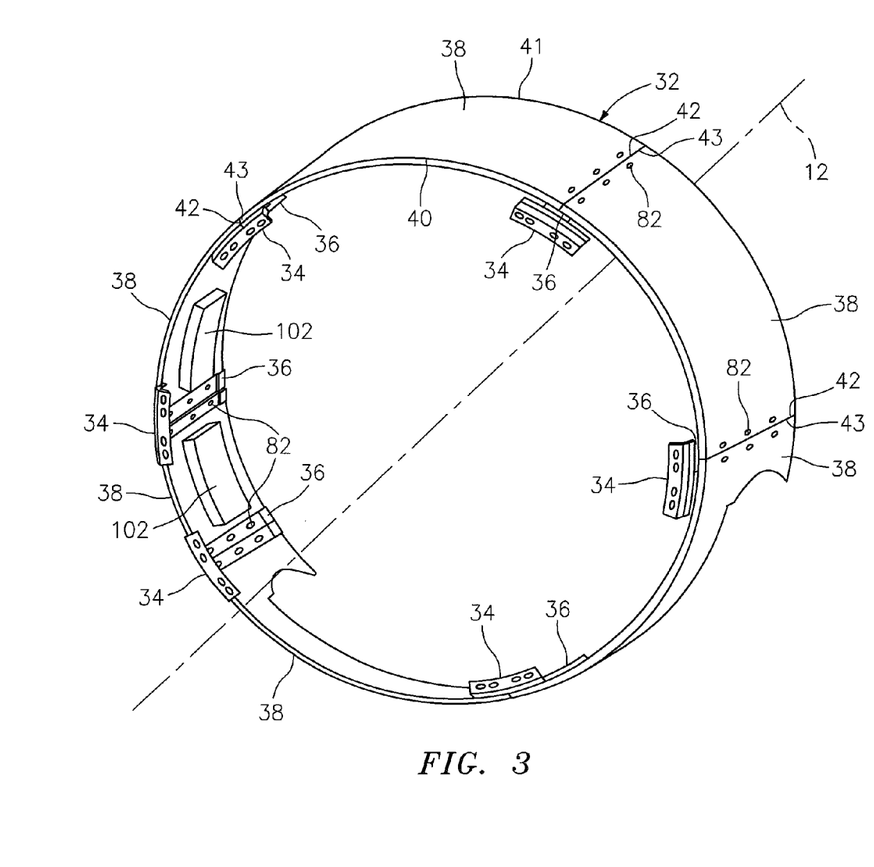
FIG. 3 is a perspective illustration of a bypass duct wall assembly for the engine of FIG. 1.

The bypass gas path 24 extends axially through and is defined by a bypass duct 26. Referring to FIGS. 1 and 2, the bypass duct 26 includes a bypass duct wall assembly arranged axially between one or more forward stator vanes 28 (e.g., exit guide vanes) and one or more aft struts 30 and/or fairings. Referring now to FIG. 3, the wall assembly includes an annular bypass duct wall 32, a plurality of mounting brackets 34 and a plurality of wall brackets 36.

The wall 32 extends axially along and circumferentially around the centerline 12. The annular bypass duct wall 32 embodiment of FIG. 3 includes a plurality of panels 38. One or more of the panels 38 extend axially between a forward wall end 40 and an aft wall end 41. Each of the panels 38 extends circumferentially between respective panel sides 42, 43.

Figure 4:
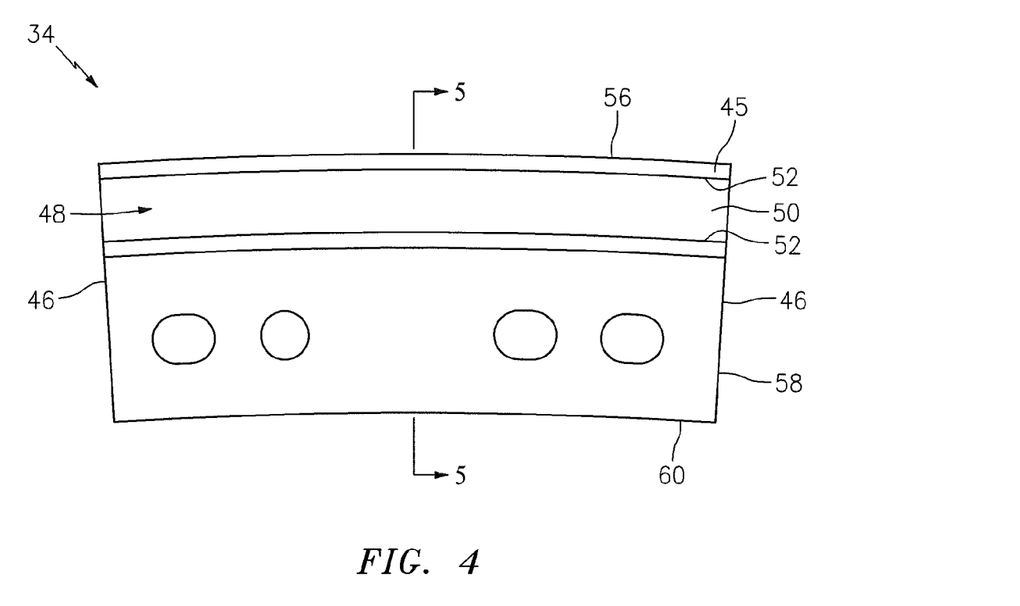
FIG. 4 is an illustration of an end of a mounting bracket for the wall assembly of FIG. 3.
Figure 5:
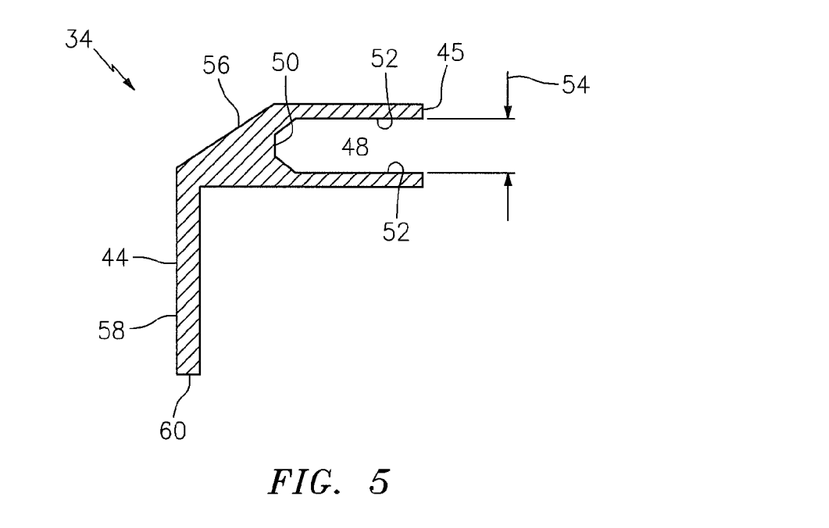
FIG. 5 is a sectional illustration of the mounting bracket of FIG. 4.

Referring to FIGS. 4 and 5, each of the mounting brackets 34 extends axially between a forward bracket end 44 and an aft bracket end 45. Each of the mounting brackets 34 extends laterally between opposing bracket sides 46. Each of the mounting brackets 34 includes a groove 48, which extends axially into the respective bracket 34 from the aft bracket end 45 to a groove end surface 50. The groove 48 extends laterally through the respective bracket 34 between the bracket sides 46. The groove 48 also extends between opposing groove side surfaces 52 defining a (e.g., radial) groove height 54 therebetween. The mounting bracket 34 embodiment of FIGS. 4 and 5 also includes a C-channeled base 56 and a mounting flange 58. The base 56 defines the groove 48, and extends axially between the bracket ends 44 and 45. The mounting flange 58 is arranged at the forward bracket end 44, and extends radially inwards from the base 56 to a distal flange end 60.

Figure 6:
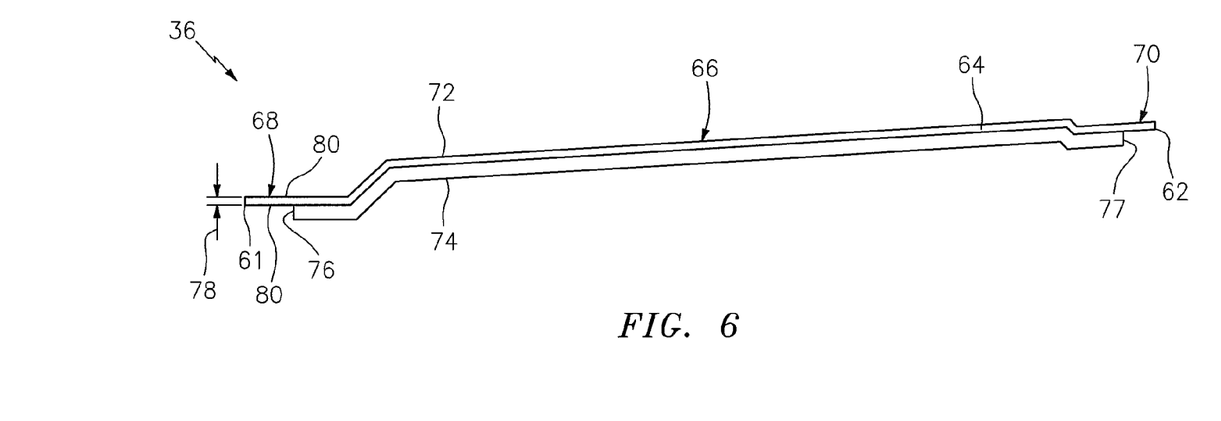
FIG. 6 is an illustration of a side of a wall bracket for the wall assembly of FIG. 3.
Figure 7:
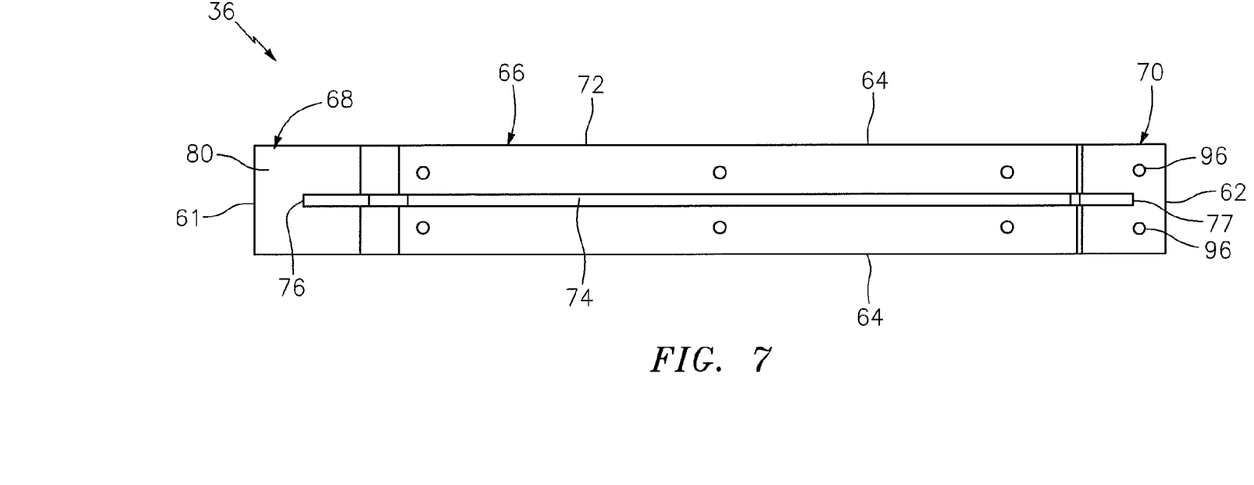
FIG. 7 is an illustration of an inner surface of the wall bracket of FIG. 6.
Figure 8:
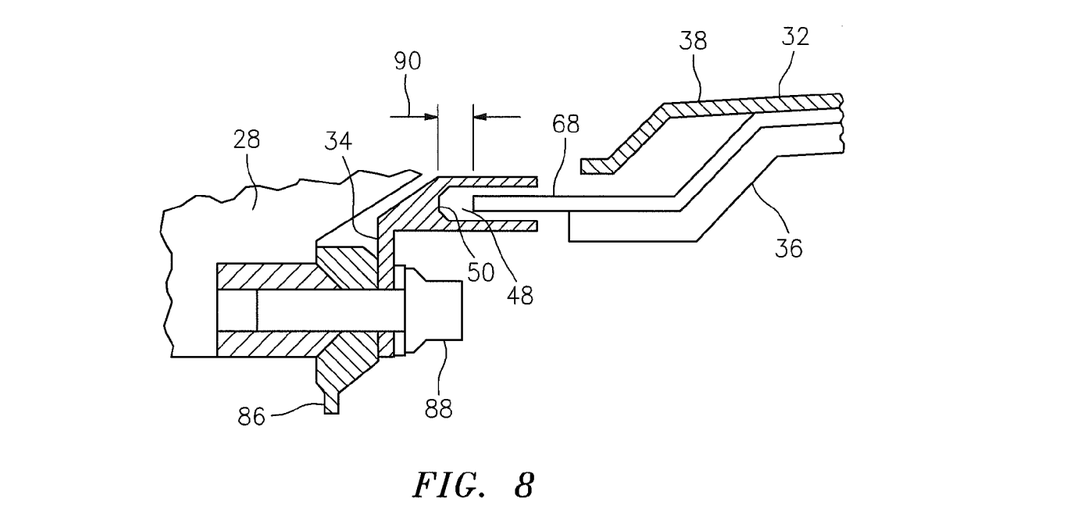
FIG. 8 is another sectional illustration of a portion of the engine of FIG. 1.

Referring to FIGS. 6 and 7, each of the wall brackets 36 extends axially between a forward bracket end 61 and an aft bracket end 62. Each of the wall brackets 36 extends laterally between opposing bracket sides 64. Each of the wall brackets 36 includes a base 66 arranged axially between a tongue 68 and a mount 70. The wall bracket 36 embodiment of FIGS. 6 and 7, for example, is configured from a T-beam having a flange 72 and a web 74, where the web 74 extends radially inwards from the flange 72 and is arranged centrally between the bracket sides 64. The base 66 is formed by a central portion of the flange 72 and the web 74. The tongue 68 is formed by a forward portion of the flange 72 that extends, for example, axially away from a forward end 76 of the web 74. The mount 70 is formed by an aft portion of the flange 72 that extends, for example, axially away from an aft end 77 of the web 74. The tongue 68 has a (e.g., radial) tongue thickness 78 that extends between opposing tongue surfaces 80 (e.g., opposing flange surfaces). The tongue thickness 78 is less than the groove height 54, as illustrated in FIG. 8.

Referring to FIG. 3, the panels 38 are arranged circumferentially around the centerline 12. The side 42 of each of the panels 38 is positioned adjacent to the side 43 of another one of the panels 38. Each of the wall brackets 36 connects a respective one of the panels 38 to an adjacent one of the panels 38. Each of the wall brackets 36, for example, is connected to each of the respective panels 38 with a plurality of fasteners 82. The mounting brackets 34 are arranged circumferentially around the centerline 12, and respectively circumferentially aligned with the wall brackets 36. Referring to FIG. 2, the mounting flange 58 of one or more of the mounting brackets 34 is (e.g., rigidly) connected to a core case 84 that houses at least a portion of the core 18 (e.g., the compressor section 20). One or more of the mounting brackets 34, for example, are each connected to an annular structural body 86 with one or more fasteners 88. The structural body 86 may be rigidly connected to the core case 84.

One or more of the wall brackets 36 are each flexibly connected to a respective one of the mounting brackets 34. The tongue 68 of each of the wall brackets 36, for example, extends axially into the groove 48 of a respective one of the mounting brackets 34. The tongue 68 of one or more of the wall brackets 36 is axially separated from the groove end surface 50 of a respective one of the mounting brackets 34 by an axial length 90 as shown in FIG. 8. Referring again to FIG. 2, the mount 70 of one or more of the wall brackets 36 is (e.g., rigidly) connected to the core case 84. The mount 70 of each of the wall brackets 36, for example, is connected to another annular structural body 92 (e.g., a firewall) with one or more fasteners 94. The fasteners 94 extend through fastener apertures 96 (see FIG. 7) in the respective mount 70, and into the structural body 92 and/or the wall 32. The structural body 92 may be rigidly connected to the core case 84.

Internal and/or external forces may cause various turbine engine 10 components to move (e.g., deform, shift, flex, expand, contract, etc.) during engine 10 operation. Examples of internal forces are those caused by thermal gradients, pressure differentials, etc. Examples of external forces are those caused by turbulence, aircraft landings, etc. The wall assembly of FIG. 2 may accommodate such movement, for example, without transferring structural loads through the wall 32. One or more of the tongues 68, for example, may move radially, axially and/or circumferentially within the respective grooves 48 to accommodate relative movement between the structural bodies 86 and 92. The flexible connections between the wall brackets 36 and the mounting brackets 34 therefore may reduce internal stresses within the wall 32.

Figure 9:
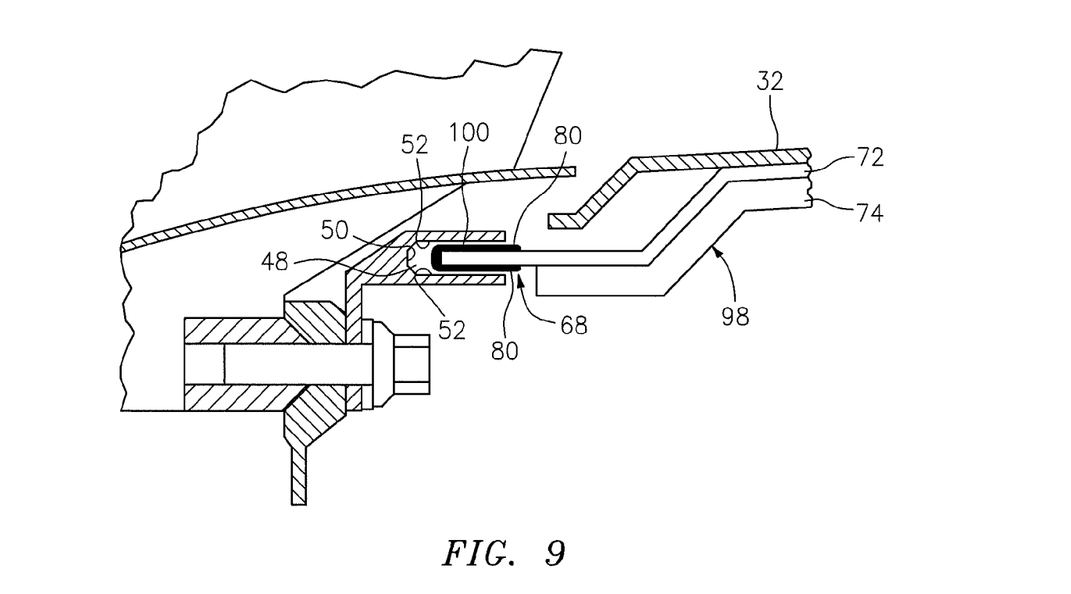
FIG. 9 is a sectional illustration of a portion of the engine of FIG. 1 with an alternative embodiment wall bracket.

FIG. 9 illustrates the wall assembly with an alternate embodiment wall bracket 98. In contrast to the wall bracket 36 of FIG. 2, the tongue 68 of the wall bracket 98 includes a wear member 100 that, for example, wraps around the forward portion of the flange 72. The wear member 100 may radially engage the groove side surfaces 52 and/or axially engage the groove end surface 50 during engine 10 operation to reduce or prevent mounting and/or wall bracket wear, and/or to damp mounting and/or wall bracket vibrations. An example of a wear member is a fabric reinforced rubber seal. The present invention, however, is not limited to any particular wear member type, configuration and/or materials.

Referring to FIG. 3, in some embodiments, the wall assembly may include one or more compressor bleed ducts 102. Each of the bleed ducts 102 may be connected to a respective one of the panels 38.

In some embodiments, one or more of the grooves 48 may each be configured as a channel that extends laterally through the respective mounting bracket 34 as illustrated in FIGS. 4 and 5. In other embodiments, one or more of the grooves may each be configured as a slot that extends laterally into the respective mounting bracket, or extends laterally between opposing side surfaces. In some embodiments, one or more of the grooves 48 may each have an arcuate cross-sectional geometry as illustrated in FIG. 4. In other embodiments, one or more of the grooves may each have a substantially rectangular cross-sectional geometry. The present invention therefore is not limited to any particular groove geometry and/or configuration.

In some embodiments, the tongue thickness of one or more of the tongues may be substantially equal to the groove height to reduce or prevent radial movement between the tongue and the respective mounting bracket. In some embodiments, one or more of the tongues may each be sized to axially engage the respective groove end surface to reduce or prevent axial movement between the tongue and the respective mounting bracket. In some embodiments, one or more of the mounting and/or wall brackets may have configurations other than those described above and illustrated in the drawings. The present invention therefore is not limited to any particular wall and/or mounting bracket geometries and/or configurations.

A person of skill in the art will recognize the wall brackets and the mounting brackets may be utilized with various types and configurations of turbine engine walls other than the multi-panel wall described above and illustrated in the drawings. In some embodiments, for example, the wall may be configured as a unitary annular hoop. In some embodiments, the wall may extend partially circumferentially around the centerline. In some embodiments, the wall may be included in a different portion of the engine. The present invention therefore is not limited to any particular wall configuration and/or location.

The term "at" may describe a relative location that is adjacent, proximate or on another location. The term "lateral" may describe a circumferential direction or a tangential direction. The term "fastener" may describe a rivet, a screw, a nut and bolt, a pin, a latch or lock, a linkage, etc. The term "connect" may describe a direct or indirect connection between a plurality of elements, which connection may be made by mechanically fastening, welding, brazing or otherwise adhering the elements together. The term "engage" may describe how a plurality of elements contact one another, or transfer forces between one another through an intermediate medium such as, for example, a seal, wear member, coating, etc. The term "aperture" may describe a hole, a channel, a slot, an indentation, etc.

The terms "upstream", "downstream", "inner" and "outer" are used to orientate the components of the wall assembly described above relative to the turbine engine and the centerline. A person of skill in the art will recognize, however, the wall assembly components may be utilized in other orientations than those described above. In alternate embodiments, for example, the mounts 70 may be connected to the structural body 86 and the mounting brackets 58 may be connected to the structural body 92. The present invention therefore is not limited to any particular wall assembly spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A wall assembly for a turbine engine, comprising:
   a wall extending axially along a centerline of the turbine engine, and circumferentially at least partially around the centerline;
   a plurality of mounting brackets arranged circumferentially around the centerline, each of the plurality of mounting brackets includes a groove that extends axially into the respective mounting bracket; and
   a plurality of wall brackets radially within the wall, at least one of the plurality of wall brackets including a tongue and a base, wherein the tongue extends axially from the base into the groove of a respective one of the plurality of mounting brackets, and the base is connected to the wall;
   wherein the wall assembly forms an inner radial portion of a bypass duct of the turbine engine, and the plurality of wall brackets connect the wall to the plurality of mounting brackets;
   wherein the wall includes a plurality of panels that are arranged circumferentially around the centerline; and
   wherein the base of at least one of the wall brackets connects a first of the plurality of panels to a second of the plurality of panels.

2. The wall assembly of claim 1, wherein
   the groove of a first of the plurality of mounting brackets has a radial groove height; and
   the respective tongue that extends into the groove of the first of the plurality of mounting brackets has a radial tongue thickness that is less than the radial groove height.

3. The wall assembly of claim 1, wherein
   the groove extends axially into the respective mounting bracket to a groove end surface; and
   the respective tongue is separated from the groove end surface by an axial length.

4. The wall assembly of claim 1, wherein the tongue of a first of the plurality of wall brackets includes a wear member that radially engages a respective one of the plurality of mounting brackets.

5. The wall assembly of claim 1, wherein the groove of a first of the plurality of mounting brackets has an arcuate cross-sectional geometry.

6. The wall assembly of claim 1, wherein
   a first of the plurality of wall brackets further includes a mount with one or more fastener apertures; and
   the base of the first of the plurality of wall brackets is arranged axially between the tongue of the first of the plurality of wall brackets and the mount.

7. The wall assembly of claim 1, wherein the wall is positioned radially between the plurality of wall brackets and a bypass gas path which extends axially through the bypass duct.

8. The wall assembly of claim 1, wherein a circumferential length of the groove is greater than a radial height of the groove.

9. A wall assembly for a turbine engine, comprising:
   a wall extending axially along a centerline of the turbine engine, and circumferentially at least partially around the centerline;
   a mounting bracket including a groove that extends axially into the mounting bracket, wherein the groove has a radial groove height; and
   a wall bracket including a tongue and a base, wherein the tongue extends axially from the base into the groove and has a radial tongue thickness that is less than the radial groove height, and the base is connected to and radially within the wall;

wherein the wall assembly forms an inner radial portion of a bypass duct of the turbine engine, and the wall bracket connects the wall to the mounting bracket;

wherein the wall includes a plurality of panels that are arranged circumferentially around the centerline; and wherein the base of the wall bracket connects a first of the plurality of panels to a second of the plurality of panels.

10. The wall assembly of claim 9, wherein the mounting bracket is one of a plurality of mounting brackets that are arranged circumferentially around the centerline;

the wall bracket is one of a plurality of wall brackets; and the tongue of at least one of the plurality of wall brackets extends into the groove of a respective one of the plurality of mounting brackets.

11. The wall assembly of claim 9, wherein the groove extends axially into the mounting bracket to a groove end surface, and the tongue is separated from the groove end surface by an axial length.

12. The wall assembly of claim 9, wherein the tongue includes a wear member that radially engages the mounting bracket.

13. The wall assembly of claim 9, wherein the wall bracket further includes a mount with one or more fastener apertures, and the base is arranged axially between the tongue and the mount.

14. The wall assembly of claim 9, wherein the wall is configured to be positioned radially between the wall bracket and a bypass gas path which extends axially through the bypass duct.

15. A turbine engine, comprising:

a core housed within a core case that extends axially along a centerline, the core comprising a compressor section; and a bypass duct extending circumferentially at least partially around the centerline and the core case, the bypass duct including a duct wall including a plurality of panels arranged circumferentially around the centerline;

a plurality of mounting brackets connected to the core case, each of the plurality of mounting brackets including a groove that extends axially into the respective mounting bracket; and a plurality of wall brackets, each of the plurality of wall brackets including a tongue, a base and a mount, wherein the tongue extends axially into the groove of a respective one of the plurality of mounting brackets, the base is arranged axially between the tongue and the mount, the base is connected to the duct wall, and the mount is connected to the core case;

wherein the plurality of wall brackets connect the duct wall to the plurality of mounting brackets, wherein the base of at least one of the plurality of wall brackets connects a first of the plurality of panels to a second of the plurality of panels, and the turbine engine is configured as a turbofan turbine engine.

16. The turbine engine of claim 15, wherein a first of the plurality of mounting brackets is rigidly connected to the core case; and the mount of a first of the plurality of wall brackets is rigidly connected to the core case.

17. The turbine engine of claim 15, wherein the bypass duct further includes one or more stator vanes arranged upstream of the duct wall.

18. The turbine engine of claim 15, wherein the duct wall forms a radial inner side portion of the bypass duct.

19. The turbine engine of claim 15, wherein the duct wall is disposed radially between the plurality of wall brackets and a bypass gas path which extends axially through the bypass duct.

* * * * *